Patented May 28, 1946

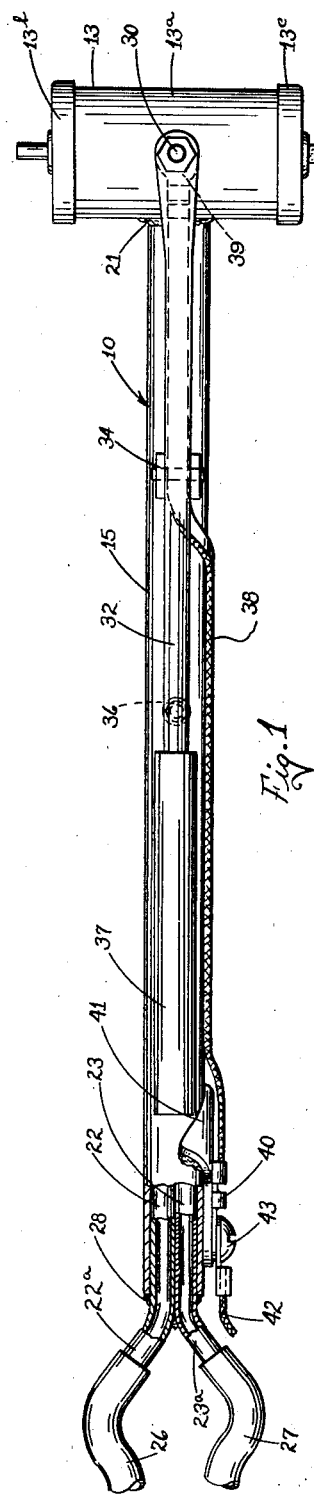

2,400,903

UNITED STATES PATENT OFFICE 2,400,903

WELDING TOOL

Edward J. Allen, Cleveland, Ohio, assignor to The Leece-Neville Company, Cleveland, Ohio, a corporation of Ohio Application October 2, 1944, Serial No. 556,752

4 Claims. (Cl. 219—8)

This invention relates to welding tools of the kind used for holding and manipulating an electrode or welding rod and, more particularly, aims to provide an improved device of this character which is strong and durable and can be safely and comfortably handled for prolonged periods of use.

Another object of this invention is to provide an improved construction for a device of this character which permits the device to be effectively cooled so that the interruption and inconvenience, which have heretofore resulted from overheating, can be avoided.

This invention can be further briefly summarized as consisting in certain novel combinations and arrangements of parts hereinafter described and particularly set out in the appended claims.

In the accompanying sheet of drawings:

Fig. 1 is a plan view of a welding tool embodying the present invention, certain portions of the tool being broken away.

Fig. 2 is a side view of the tool.

Fig. 3 is a partial sectional view of the tool taken on line 3—3 of Fig. 2.

Fig. 4 is a partial sectional view taken on line 4—4 of Fig. 3 and

Fig. 5 is a transverse sectional view of the handle of the tool taken on line 5—5 of Fig. 4.

The improved welding tool of the present invention is in the form of a compact device 10 which is adapted to be manually grasped and manipulated and which serves as a holder for an electrode or welding rod 11. The embodiment of the device shown in the drawing comprises, in general, an elongated head or body 13 having a substantially central axial opening 14 in which the rod 11 is received and supported, and a handle 15 connected with the head and adapted to be grasped by the workman using the tool.

The head 13 is preferably hollow so as to provide a chamber 16 therein to which cooling medium, preferably a liquid, can be supplied as will be explained more fully hereinafter. The head is here shown as comprising a tubular section 13a having its ends closed by means of the end walls or covers 13b and 13c so as to provide the cooling chamber 16 in such head. The covers 13b and 13c can be connected with the main section 13a by any suitable means such as welding, brazing or the like, which is indicated at 17.

The axial opening 14 for receiving the rod 11 is preferably formed in the head by providing the latter with a hollow member or tube 18 which extends axially through the head so as to extend across the chamber 16. The passage of the hollow member 18 forms the opening 14 which is of a size to readily receive the rod 11 so that this member constitutes a guiding and supporting means for the rod. The hollow member 18 can be mounted in the head 13 as by extending the ends of such member through the end walls or covers 13b and 13c at which points the ends of the hollow member are flanged or flared and can also be welded or soldered as indicated at 19. Since the hollow member 18 extends across the chamber 16 it will be surrounded by the cooling medium and effectively cooled thereby.

The handle 15 comprises an elongated member preferably a tube, having one end thereof attached to the head 13 as by being welded, brazed or soldered to the section 13a as indicated at 21. The handle 15 is of a length suitable for convenient manipulation of the device.

The cooling medium is preferably supplied to the chamber 16 of the head 13 through supply and return passages contained in the handle 15. These passages may be in the form of supply and return tubes 22 and 23 which extend through the handle 15 and have their inner ends connected with the head 13 so as to communicate with the chamber 16 therein. The end of the handle to which the head 13 is connected may have a plug or closure 24 therein through which the tubes 22 and 23 extend and which prevent the escape of fluid from the chamber except through the return or discharge tube 23. The delivery end of the supply tube 22 preferably extends into the chamber 16 and is curved as shown in Fig. 4 so as to discharge the cooling medium circumferentially of the cooling chamber for causing a more effective circulation of the medium therein. The tubes 22 and 23 are of a length such that portions 22a and 23a thereof project from the handle 15 and to which the flexible supply and return conduits 26 and 27 are connected. The outer end of the handle 15 is sealed and connected with the tube portions 22a and 23a, as by means of welding or brazing 28 and these tube portions preferably extend outwardly from the handle in diverging relation to each other so as to facilitate the connection of the supply and return conduits 26 and 27 therewith.

In cases where the handle 15 is hollow, as here shown, the portion of the return tube 23 extending within the handle can be omitted if desired and the opening of the handle itself can be used for this portion of the return passage for the cooling medium. In this case the return tube 23 to which the return or drain conduit 27 is connected would be merely a short section of tubing corresponding with the portion 23a but extending only part-way into the handle 15 and connected in sealed relation therewith by the welding or brazing 28.

The rod 11 which is inserted into the hollow support 18 of the head 13 is clampingly held in such support by means of a pin 30 which is movable in a direction transversely of the opening 14 of the hollow support. For accommodating the pin 30 the head 13 is provided with an opening or sleeve 31 which extends substantially radially of the head and intersects the opening 14 of the hollow support 18. The inner end of the sleeve 31 is connected with the hollow support 18 so as to permit the pin 30 to enter the latter for clamping engagement with the rod 11 and such as to prevent the leakage of cooling medium from the chamber 16 into the hollow support 18 or into the sleeve 31.

The outer end of the pin 30 projects from the sleeve 31 and is connected with an actuating lever 32, as by means of the clamping nuts 33 provided on such pin. The actuating lever 32 is supported adjacent the handle 15 and is pivotally mounted thereon, as by means of a suitable bracket 34, so that a grip or handle portion 35 of such lever will be in a position to be conveniently grasped by the workman for swinging the lever in a direction to release the clamping engagement of the pin 30 with the rod 11. A compression spring 36 located between the lever 32 and handle 15 acts on the lever in a direction to urge the pin 30 into clamping engagement with the rod 11. A heat- and electrically-insulating sleeve 37 formed of suitable insulating material can be provided on the grip portion 35 of the lever 32.

The rod 11 can be a metallic welding rod or can be an electrode formed of carbon or other suitable material. When the device 10 is used in connection with electric welding, one side of the welding circuit is preferably connected with the rod 11 through the pin 30. This is accomplished by providing a flexible electric conductor 38 on the tool and which has a terminal element 39 anchored on the pin 30. The other end of the conductor has a terminal element 40 thereon which in anchored on the device 10 by being connected with a lug 41 projecting from the handle 15. A flexible conductor or lead 42 forming a part of the welding circuit is anchored on the lug 41 and electrically connected with the terminal element 40 as by means of the screw 43.

In the construction above described for my improved welding tool 10, it will be observed that the handle 15 is connected with the head 13 at a point such that the longitudinal axis of the handle lies substantially in the transverse midplane of the head. Likewise it will be seen from Fig. 2 that the axis of the handle and the longitudinal axis of the head lie in the same horizontal plane. This relative arrangement for the head and handle provides a comfortably balanced device which can be conveniently handled and manipulated by the workman. It will be noted also that the sleeve 31 in which the clamping pin 30 operates and the actuating lever 32 for the pin are likewise located so that their axes lie substantially in the transverse midplane of the head 13. This location for these members contributes to the balanced condition of the device 10 and enables the actuating lever 32 to be pivotally mounted directly on the handle 15 and locates the grip element 35 in a position to be conveniently grasped by the workman's hand which holds and manipulates the device.

From the foregoing description and the accompanying drawing it will be readily understood that the present invention provides a strong and compact welding tool which is well balanced and which can be comfortably handled by a workman for prolonged periods of use. It will be seen also that the improved construction of this device permits cooling medium to be circulated in a manner to produce a very effective cooling action.

While I have illustrated and described my improved welding tool in considerable detail it will be understood, of course, that I do not wish to be correspondingly limited but regard my invention as including all changes and modifications coming within the scope of the appended claims.

Having thus described my invention, I claim:

1. A manually portable device for holding a welding rod or the like comprising a handle adapted to be grasped by one hand of the operator for manipulating the device, an elongated hollow head mounted on one end of said handle so as to extend transversely of the axis of the handle, said head having a chamber therein for cooling medium, a hollow rod support extending longitudinally of said head and through said chamber so as to be surrounded by the cooling medium, movable clamping means engageable with the rod and having an actuating member adjacent said handle, and a spring acting on said clamping means for urging the same into holding engagement with the rod, said actuating member being located relative to said handle so as to be in a position to be grasped by the same hand that manipulates the device.

2. A device for holding a welding rod or the like comprising a handle, an elongated hollow head mounted on one end of said handle so as to extend transversely of the axis of the handle, said head having a chamber therein for cooling medium and a hollow rod support extending longitudinally of said head and through said chamber so as to be surrounded by the cooling medium, a hollow member extending transversely into said head and intersecting said hollow support, a pin movable in said hollow member for clamping engagement with the rod, and means adjacent said handle and operatively connected with said pin for actuating the latter.

3. A device for holding a welding rod or the like comprising a handle, an elongated hollow head mounted on one end of said handle so as to extend transversely of the axis of the handle, said head having a chamber therein for cooling medium and a hollow rod support extending through said chamber so as to be surrounded by the cooling medium, a hollow member extending transversely into said head and intersecting said hollow support, a pin movable in said hollow member for clamping engagement with the rod, and means pivoted on said handle and operatively connected with said pin for actuating the latter, said handle and hollow member being disposed so that their axes lie substantially in the transverse midplane of said head.

4. A manually portable device for holding a rod electrode or the like comprising a tubular handle, an elongated substantially cylindrical hollow head mounted on one end of said handle so as to extend transversely of the axis of the handle and such that an extension of the axis of the handle extends substantially diametrically across the head, said head having a chamber therein for cooling fluid, a hollow rod support extending substantially centrally and longitudinally through said chamber so as to be surrounded by said fluid, said handle having passages therein communicating with said chamber for circulating the cooling fluid through the latter, a hollow member extending into said head transversely thereof and intersecting said hollow support, a pin movable in said hollow member for clamping engagement with the rod, and a spring-biased lever pivoted on said handle and connected with said pin for actuating the latter toward holding engagement with the rod.

EDWARD J. ALLEN.